United States Patent [19]

Bailey et al.

[11] Patent Number: 4,956,079

[45] Date of Patent: Sep. 11, 1990

[54] APPARATUS FOR TRANSPORTING OBJECTS

[75] Inventors: Alan Bailey, Cheadle; David K. Yew, Great Sutton, both of England

[73] Assignee: British Nuclear Fuels plc, Warrington, England

[21] Appl. No.: 309,293

[22] Filed: Feb. 13, 1989

[30] Foreign Application Priority Data

Feb. 29, 1988 [GB] United Kingdom ............... 8804497

[51] Int. Cl.$^5$ ........................... B07C 5/02; B07C 5/08
[52] U.S. Cl. .................................. 209/552; 209/598; 209/903; 209/912
[58] Field of Search ............... 209/552, 598, 903, 909, 209/912, 914, 922, 925

[56] References Cited

U.S. PATENT DOCUMENTS

| | | |
|---|---|---|
| 2,318,856 | 5/1943 | Hoffman ........................ 209/598 X |
| 2,331,422 | 10/1943 | Reynolds ........................... 209/627 |
| 2,422,036 | 6/1947 | Oakley .............................. 209/598 X |
| 2,531,317 | 11/1950 | Baney et al. ..................... 209/598 X |
| 2,860,777 | 11/1958 | Ortegren et al. ..................... 209/570 |
| 2,881,918 | 4/1959 | Cunha ............................. 209/598 X |
| 3,279,599 | 10/1966 | Drennan ......................... 209/925 X |
| 3,318,137 | 5/1967 | Denlinger et al. ............. 209/598 X |
| 3,502,208 | 3/1970 | Muller ................................. 209/598 |
| 4,651,880 | 3/1987 | Mabboux et al. .................. 209/557 |

Primary Examiner—Dennis H. Pedder
Attorney, Agent, or Firm—William R. Hinds

[57] ABSTRACT

Apparatus for transporting objects in succession through a measuring head. A common drive shaft provides synchronised movement of transfer apparatus, gripper apparatus and indexing apparatus. The transfer apparatus receives objects from a supply and carries the objects to the measuring head. The gripper apparatus receives the objects from the transfer apparatus and carries the objects through the measuring head. The indexing apparatus receives objects from the gripper means and conveys the objects to an outlet.

8 Claims, 8 Drawing Sheets

APPARATUS FOR TRANSPORTING OBJECTS

The present invention concerns apparatus for transporting objects through a measuring head. The objects can be cylindrical pellets as used in nuclear fuel pins and the measuring head can be a caPacitive transducer.

FEATURES AND ASPECTS OF THE INVENTION

According to the present invention apparatus for transporting objects through a measuring head comprises a transfer area for receiving objects individually from a supply and conveying the objects to one side of the measuring head, gripper means at the head for receiving the object from the transfer area and carrying the object through the head and indexing means at the opposite side of the head to remove the object from the gripper means and to convey the object to an outlet selected in response to signals generated by the object in passing through the head, and a common drive means for synchronising movements of the transfer area, gripper means and indexing means.

DESCRIPTION OF THE DRAWINGS

The invention will be described further, by way of example, with reference to the accompanying drawings; in which.

DESCRIPTION OF THE PREFERRED EMBODIMENTS

Figure 1:
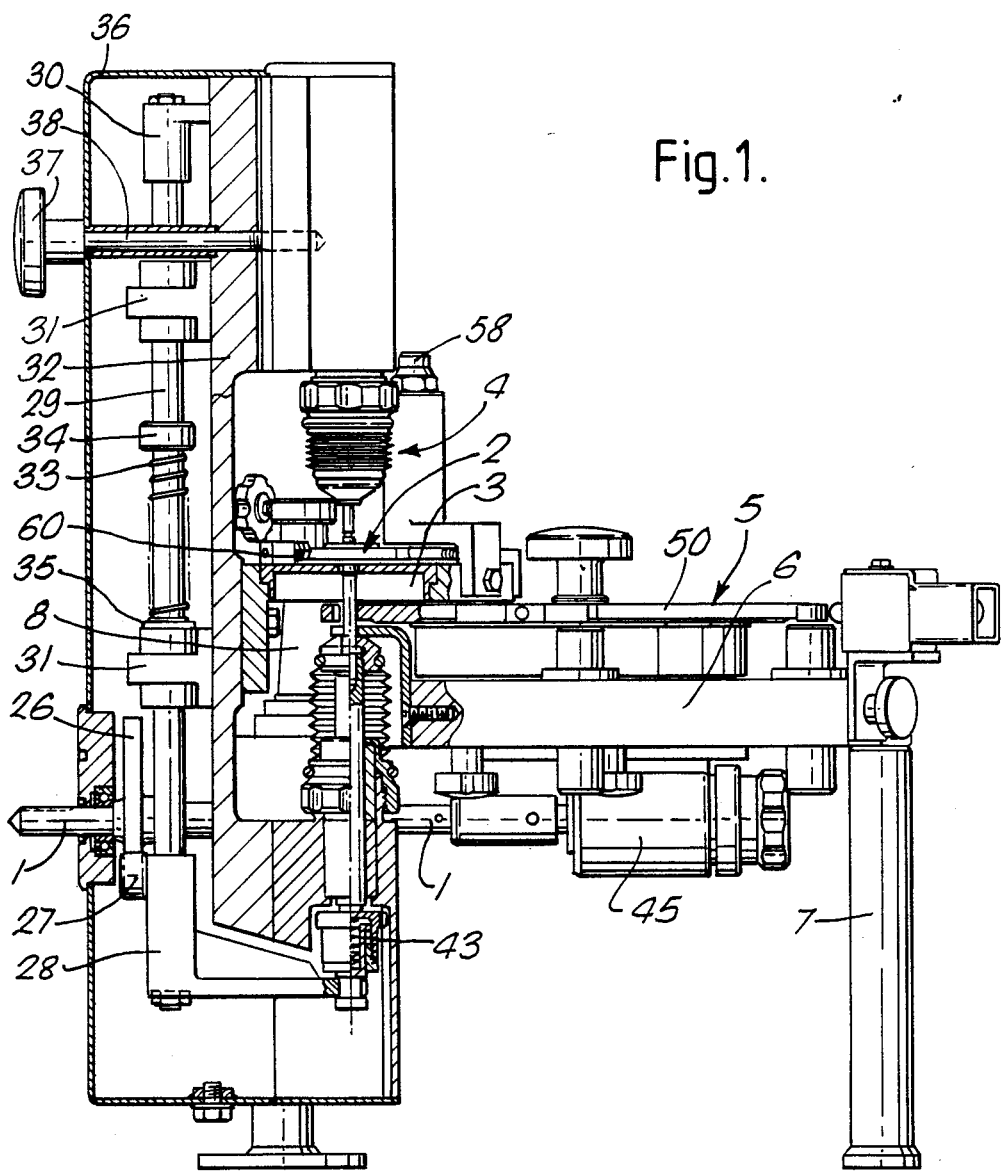
FIG. 1 is a part sectional elevation of an apparatus for transporting objects individually through a measuring head.

A drive shaft 1 is driven by a motor through a gearbox and a torque limiter coupling. The drive assembly is not shown in the drawings. The drive shaft 1 is arranged to drive three different parts of the apparatus, namely, a transfer arm means 2 for conveying pellets to a measuring head 3; cooperating anvils or plungers 4 for gripping and carrying pellets through the measuring head, and an indexing mechanism 5 for receiving pellets from the measuring head. The different parts of the apparatus, including the drive shaft 1, are mounted on a support plate 6 carried by legs 7.

With reference to FIGS. 1 to 4, the transfer arm means 2 comprises a hollow pillar 8 mounted on a base plate 9. A shaft 10 is journalled for rotation in the pillar 8, the shaft being supported at the upper end of the pillar by a bush 11 and being supported at the lower end of the pillar by a ball bearing assembly 12. A lever 13 is mounted on and secured for rotation with the shaft 10 at the upper end of the pillar 8. A transfer arm 14 is located on the shaft 10 above the lever 13 and is held in position by a retainer 15 at the end of the shaft 10. The transfer arm 14 is pivotable about the shaft 10 and is influenced by a compression spring 16 on a spring rod 17 and extending between the lever 13 and the arm 14. A clamp 18 is mounted at an end of the arm 14 and is urged by a compression spring 19 to pivot about an axis 20. The clamp 18 is shaped to releasably hold a pellet in a V-notch 21 in the transfer arm 14.

A further lever or bar 22 is secured for rotation to the lower end of the shaft 10 protruding from the pillar 8. The lever 22 carries a cam follower 23 which is rotatably journalled in the lever 22 by ball bearing assembly 24.

Figure 5:
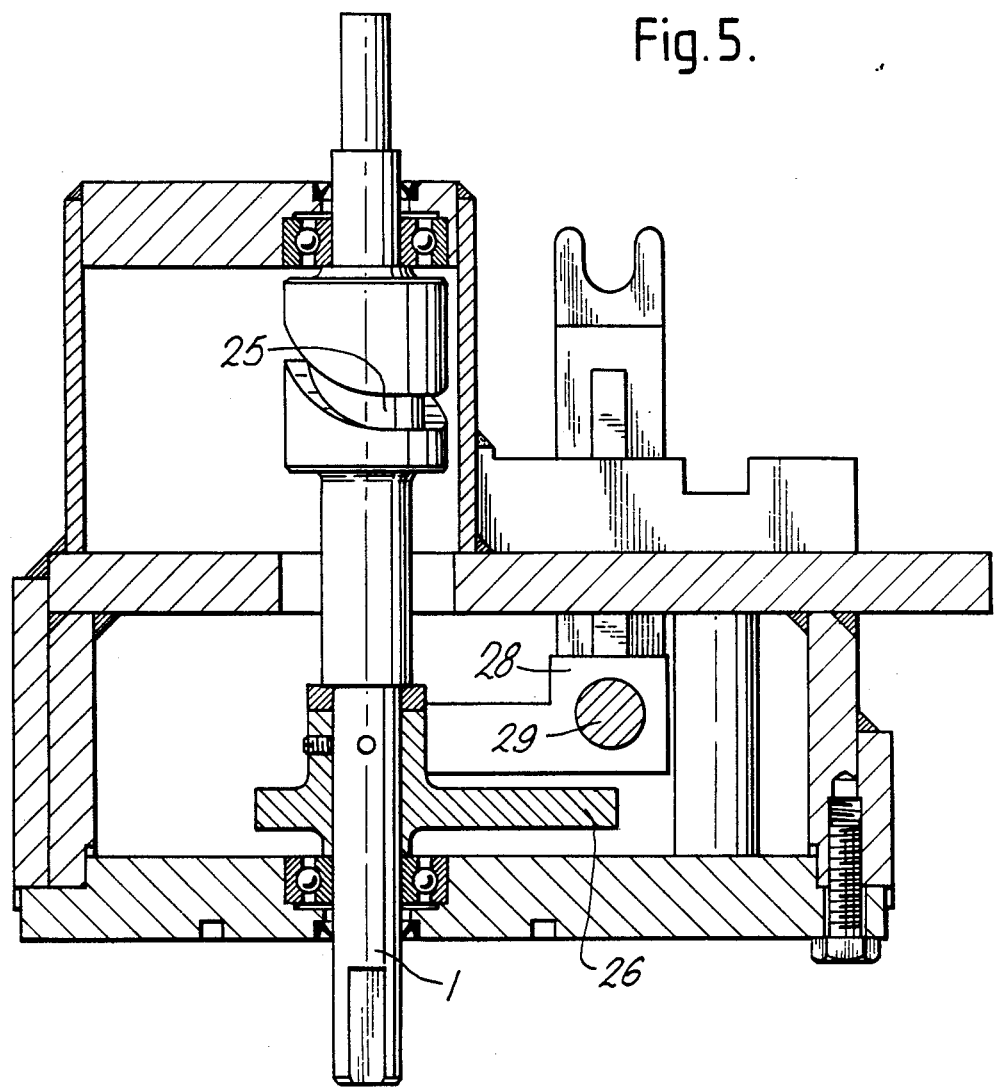
FIG. 5 is a sectional plan view showing drive means for the apparatus as shown more generally in elevation in FIG. 1.

With reference to FIG. 5, the cam follower 23 cooperates with a cam track 25 on the drive shaft 1. Rotation of the shaft 1 causes the lever 22 to pivot about the axis of the shaft 10 to thereby rotate the shaft 10 and the lever 13. Movement of the lever 13 is transferred to the arm 14 through the compression spring 16 and spring rod 17.

Also as seen from FIGS. 1 and 5, the drive shaft 1 carries a cam 26 which cooperates with cam follower 27 rotatably journalled on a bracket 28. The bracket 28 is secured at one end of a shaft 29. A similar bracket 30 is secured at the opposite end of the shaft 29. The shaft 29 is slidable in journals 31 fixedly secured to a support plate 32. A compression spring 33 is disposed about the shaft 29 between a collar 34 and a washer 35 at one of the journals 31. The compression spring 33 serves to urge the cam follower 27 into continuous engagement with the cam 26. A housing or cover 36 is fitted to the support plate 32 to enclose the shaft 29.

Figure 6:
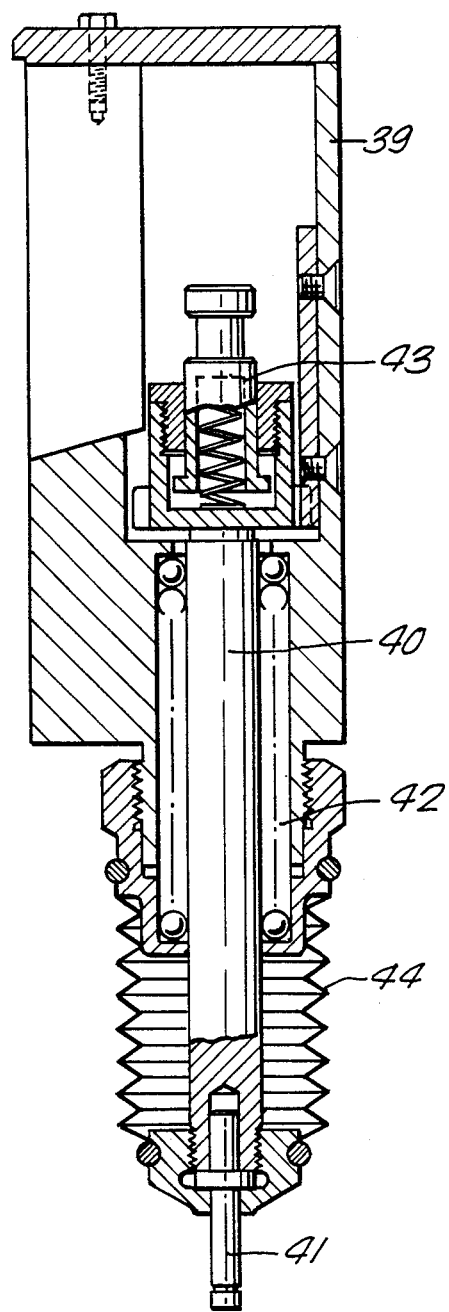
FIG. 6 is a sectional elevation view of an anvil assembly shown more generally in elevation in FIG. 1.

Each of the cooperating anvils 4 is mounted on the support plate 32 and secured by a handwheel 37 and stud 38. With reference to FIG. 6, a top anvil assembly comprises a housing 39 having an opening to receive bracket 30 at the end of the shaft 29. An anvil shaft 40 carrying an anvil 41 at its lower end is journalled in the housing 39 by ball bushing 42. A spring-loaded plunger 43 at the upper end of the anvil shaft cooperates with the bracket 30. A bellows 44 is disposed about the lower end of the anvil shaft. The lower anvil assembly is a similar construction.

Figure 7:
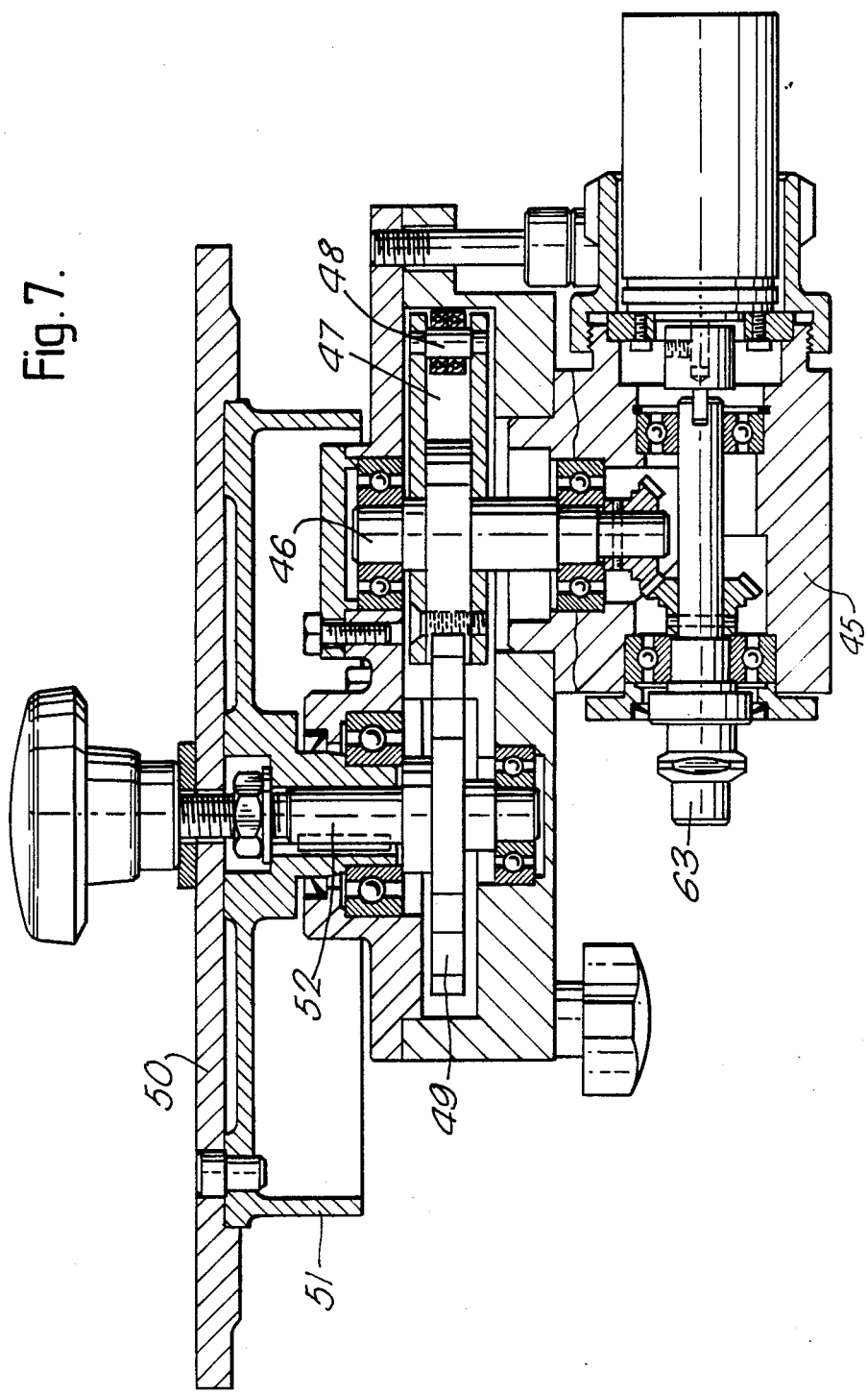
FIG. 7 is a sectional elevation view of an indexing mechanism shown more generally in elevation in FIG. 1.
Figure 8:
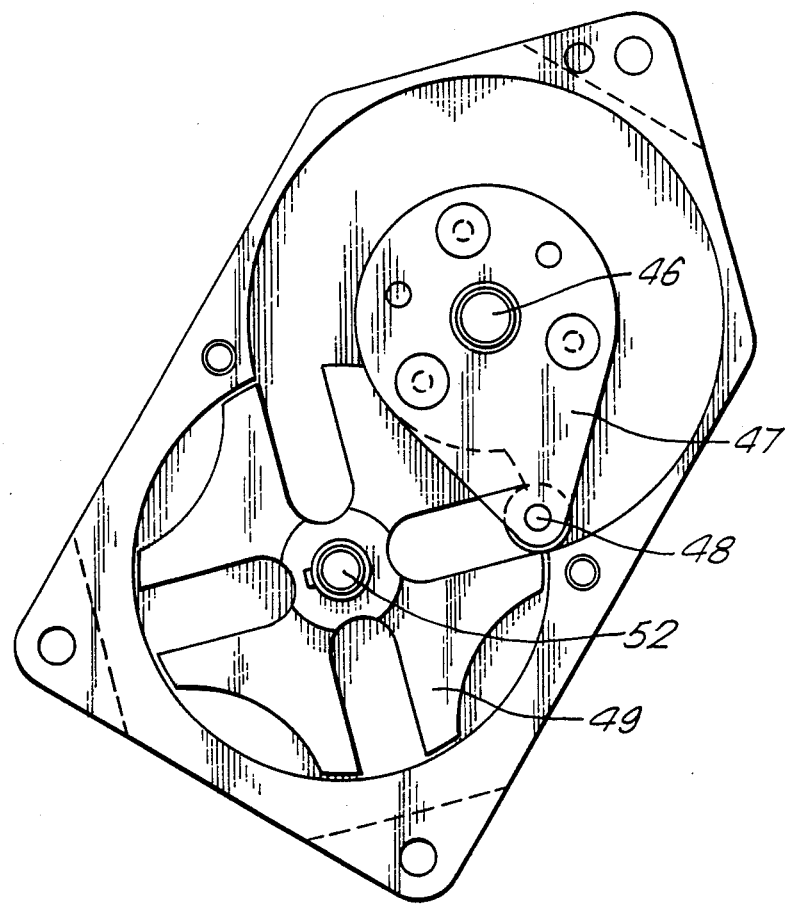
FIG. 8 is a detail in plan of part of FIG. 7 showing a Geneva drive mechanism shown more generally in elevation in FIG. 7.

The indexing mechanism 5 as seen from FIGS. 1, 7 and 8 comprises a bevel gearbox 45 to transmit drive from the shaft 63, which is connected to the shaft 1, to a crankshaft 46 of a crank 47. A driving pin 48 on the crank 47 cooperates with a Geneva wheel 49. Thus rotation of the crank about its shaft 46 causes intermittent rotary movement of the Geneva wheel 49.

Figure 2:
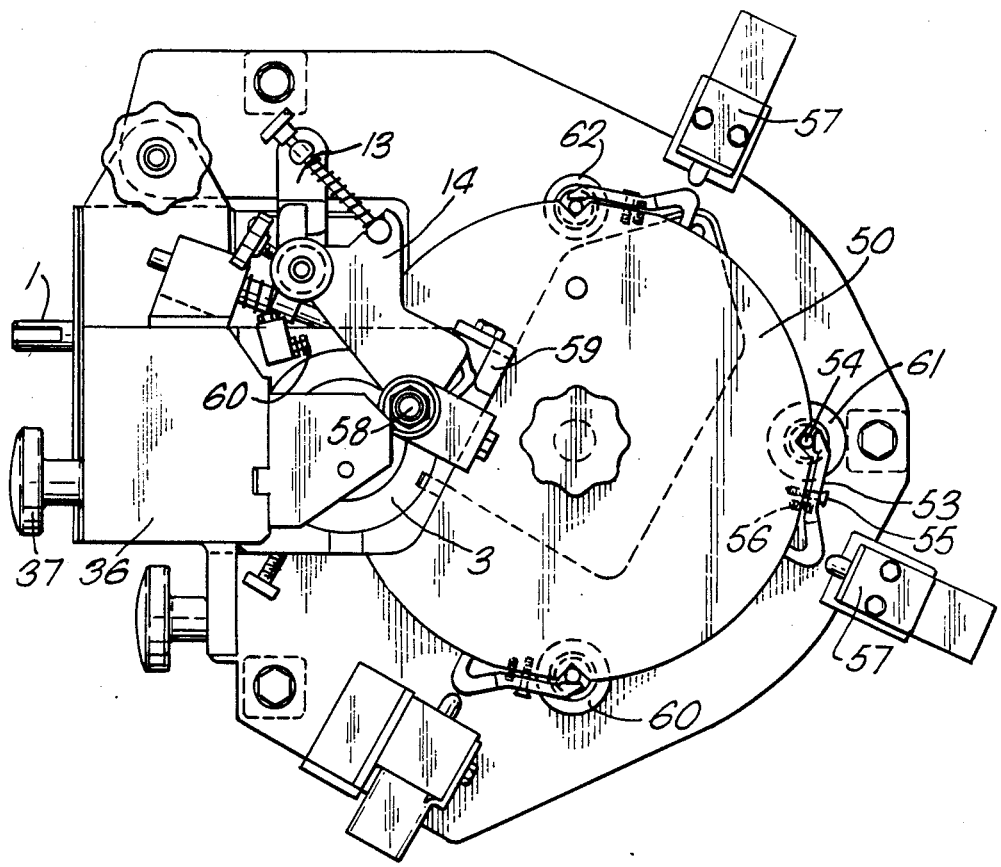
FIG. 2 is a plan view of FIG. 1.
Figure 3:
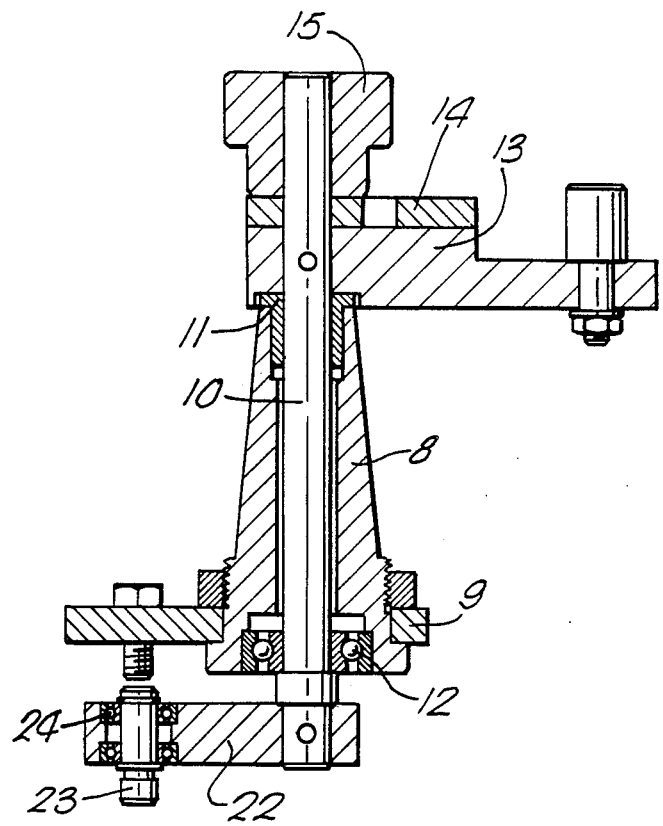
FIG. 3 is a sectional elevation view along A—A in FIG. 4 of a transfer arm forming a part of the apparatus and shown more generally in FIG. 2.
Figure 4:
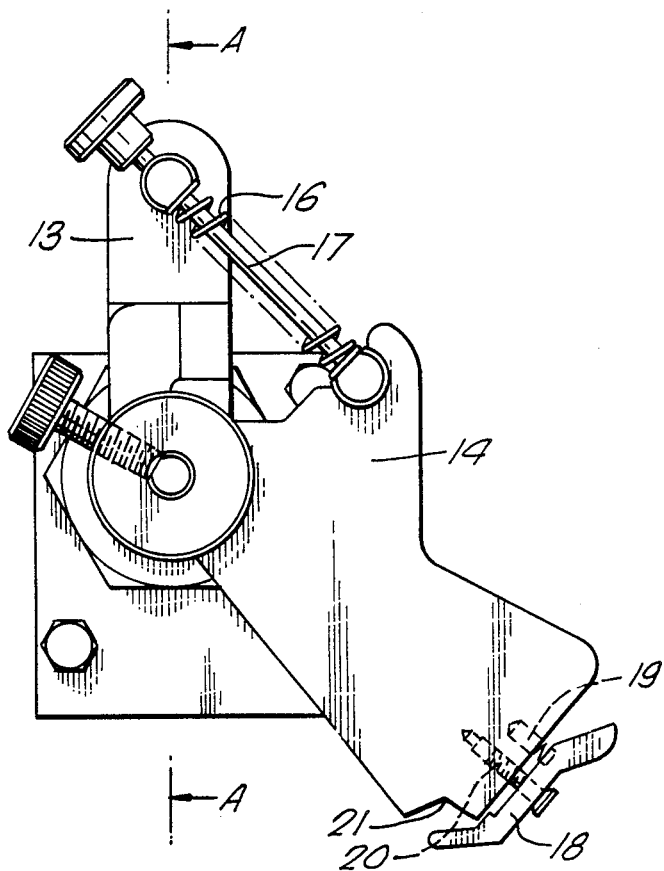
FIG. 4 is a plan view of FIG. 3 and shows in more detail the transfer arm as viewed generally in FIG. 2.

An indexing table 50 having a spigot 51 is keyed for rotation to spindle 52 of the Geneva wheel. As seen in FIGS. 1 and 2 the perimeter of the indexing table 50 carries angularly spaced apart clamps 53. The clamps cooperate with v-shaped notches 54 in the edge of the table 50 which receive pellets emerging from the measuring head 3. The clamps 53 are mounted to pivot about a support pin 55 and are each urged by a compression spring 56 to cooperate with the associated V-notch 54 in the wheel periphery. The clamps retain a pellet emerging from the measuring head in one of the V-shaped notches 54 to enable the pellet to be transported on operation of the indexing mechanism to a selected outlet. The clamp is actuated to release the pellet by electro-magnet means 57.

Pellets to be measured are introduced into the apparatus along a feed tube 58 where they are stacked vertically end to end with the leading pellet resting on the top surface of the transfer arm 14. When the first pellet falls down from the pellet stack on to the surface of the measuring head 3, the transfer arm 14 is in a position such that the clamp 18 is in an open condition by virtue of its outwardly inclined portion engaging a stop 59 on the measuring head. In this position the notch 21 is immediately below the pellet stack in the pellet feed tube 58 and a pellet can fall through the feed tube into the notch. The transfer arm is then pivoted by the cam lever 22 and the end of the clamp 18 disengages the stop 59. This enables the clamp 18 to pivot under the action of the compression spring 19 and the clamp moves to grip the pellet in the notch. Continued movement of the transfer arm caused by the cam follower 23 traversing the cam track 25 in the rotating drive shaft 1 brings the pellet to an opening or passage in the measuring head. In this position the transfer arm 14 abuts against an adjustable stop 60 mounted on the measuring head 3 and the cooperating anvils are as shown in FIG. 1 with the top of the lower anvil at or just below the surface of the measuring head and the upper anvil at the opposite side of the head. The pellet is thus deposited on the lower anvil which extends through the measuring head.

The cam 26 is profiled to provide the desired sequence of movement of the anvils 4. With the object sitting on the lower anvil the upper anvil is moved to abut against the upper end of the object. Relative movement between the upper and lower anvils is possible due to the spring-loaded plungers 43.

The object is gripped by the anvils and carried out of the clamp 18 and through the measuring head which can include a capacitive transducer. A surface profile of the pellet is obtained in moving through the measuring head and the results can be used to isolate pellets which do not fall within acceptable tolerance levels as determined by a standard used for initial calibration. The anvils 41 can serve as a standard for calibration. The signals from the measuring head resulting from the scanning of a pellet can be used to activate appropriate electro-magnet means 57.

The pellet emerging from the measuring head is received in the indexing mechanism 5. The mechamism 5, by virtue of the Geneva wheel 49, moves a pellet between equi-angularly spaced stations around the periphery of the wheel. In FIG. 2, the station 60 can receive reject pellets and the next station 61 can receive accepted pellets. A further station 62 can be used to collect sample pellets for weight and length checks.

The three different parts of the machine, that is the transfer arm means 2, the cooperating anvils 4 and the indexing mechanism 5 are driven in synchronised movement from a common drive, namely the shaft 1. In a single complete revolution of the drive shaft 1 the transfer arm 14 completes a full movement in delivering a pellet from the feed tube 58 to the anvils 4 and returning to its initial position at which the clamp 18 engages the stop 59 (FIG. 2). The profile of the camtrack 25 determines the movement of the transfer arm and the shape of the cam 26 determines the sequence of movements of the anvils 4. The indexing of the mechanism 5 is determined by the position of the pin 48 on the crank 47 relative to the Geneva wheel 49. The initial settings of the parts can be with the anvils 4 at the top of a stroke, the transfer arm 14 in a loading position and the mechanism 5 at the commencement of indexing.

We claim:

1. Apparatus for transporting objects through a measuring head comprising a transfer means for receiving objects individually from a supply and conveying the objects to one side of the measuring head, gripper means at the head for receiving the object from the transfer means and carrying the object through a passage through the head, and indexing means at the opposite side of the head to remove the object from the gripper means and to convey the object to an outlet selected in response to signals generated by the object in passing through the head, and a common drive means for synchronised movement of the transfer means, gripper means and indexing means, said transfer means comprising an arm pivotally mounted on a drive shaft.

2. Apparatus according to claim 1 in which the drive shaft is coupled to the common drive means by a cam follower on the drive shaft engageable in a cam track on the common drive means.

3. Apparatus for transporting objects through a measuring head comprising a transfer means for receiving objects individually from a supply and conveying the objects to one side of the measuring head, gripper means at the head for receiving the object from the transfer means and carrying the object through a passage through the head, and indexing means at the opposite side of the head to remove the object from the gripper means and to convey the object to an outlet selected in response to signals generated by the object in passing through the head, transfer means, gripper means and indexing means, said gripper means comprising upper and lower anvil assemblies, each assembly including an anvil shaft journalled for axial displacement in a housing, an anvil at one end of the shaft, and a spring-loaded plunger at the opposite end of the shaft.

4. Apparatus according to claim 3 including means operable to displace the anvil shafts, said means comprising a cam on the common drive means cooperable with a cam follower to effect axial displacement of the anvil assemblies.

5. Apparatus according to claim 1 in which the indexing means comprises a Geneva mechanism.

6. Apparatus according to claim 5 including a drive connection from the common drive means to the Geneva mechanism.

7. Apparatus according to claim 5 in which the indexing means includes an indexing table keyed for rotation to the Genevea mechanism.

8. Apparatus according to claim 7 including angularly spaced apart clamps on the table cooperable with notches in the edge of the table for receiving objects emerging from the measuring head.

* * * * *